April 23, 1968     H. G. HARRISON     3,379,075
PAWL MECHANISMS
Filed Sept. 29, 1965     3 Sheets-Sheet 1
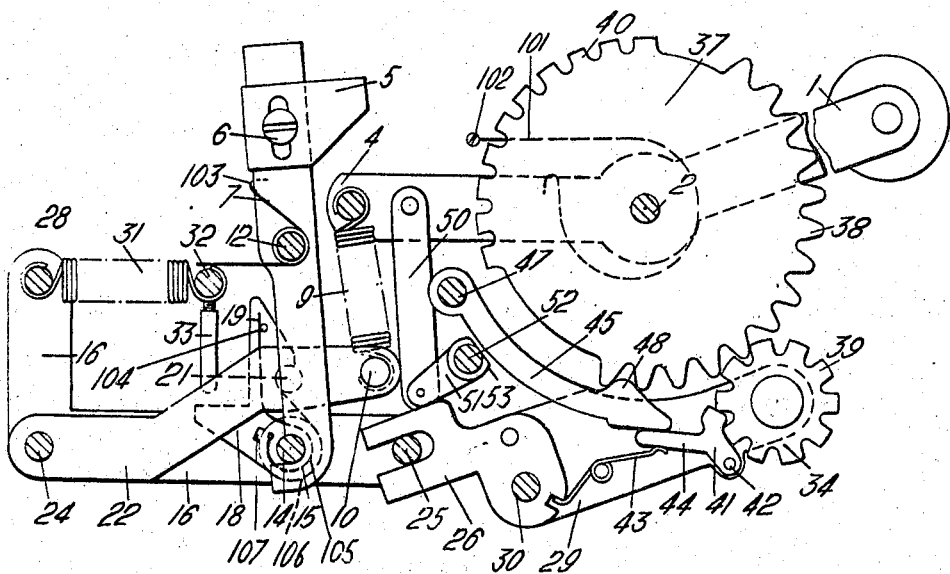
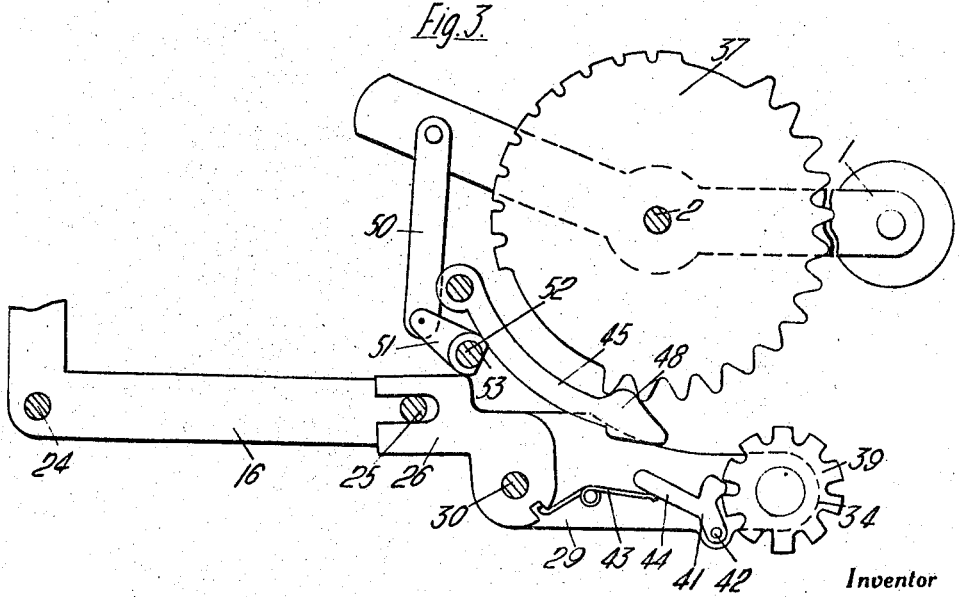
Inventor
Herbert George HARRISON
By Nolte & Nolte
Attorneys

United States Patent Office 3,379,075
Patented Apr. 23, 1968

3,379,075
PAWL MECHANISMS
Herbert George Harrison, Enfield, England, assignor to English Numbering Machines Limited, Enfield, England, a British company
Filed Sept. 29, 1965, Ser. No. 491,113
Claims priority, application Great Britain, Nov. 25, 1964, 47,833/64
4 Claims. (Cl. 74—527)

ABSTRACT OF THE DISCLOSURE

The invention relates to a pawl mechanism having two pawls for locking respectively two toothed wheels which normally mesh with each other. One of the pawls normally bears against the other to lift the other completely out of engagement with its toothed wheel while said one pawl ratchets over its toothed wheel on rotation of the same. The toothed wheels are releasable of each other while each is engaged by its pawl for ensuring re-engagement of the toothed wheels without accidental rotation of the toothed wheels about their respective axis.

---

The present invention relates to pawl mechanisms.

Pawls are commonly employed for locking toothed elements and are, for example, resiliently urged towards the toothed elements so as to engage between adjacent teeth of such elements. A pawl may also be employed as a detent, so that the pawl and its associated toothed element act as a click-stop device, the toothed element being held by the pawl in any one of a plurality of different positions, the pawl sliding over the crowns of the teeth of the toothed element on rotation of the latter. In some cases this sliding of the pawl over the crowns of the teeth is undesirable. For example, the toothed element may have, on the crowns of its teeth, type or other kinds of lettering which in time might be worn or even entirely obliterated by the pawl sliding over the lettering. Also, synthetic resin materials are increasingly being employed for parts of mechanisms such as gears and pawls, and it is therefore desirable to reduce as much as possible the friction between such parts in order to avoid wear of the synthetic resin materials.

It is an object of this invention to provide pawl mechanisms in which sliding of the pawl over a co-operating toothed element is avoided.

The present invention consists in a pawl mechanism having a pawl mounted for engagement with a toothed element, and a pawl actuator arranged to move the pawl out of contact with the toothed element in response to relative indexing movement of the toothed element and the pawl.

The invention will be more readily understood from the following description of an embodiment thereof illustrated by way of example in the accompanying drawings, in which:

FIG. 1 shows a side elevation of a printing device provided with a pawl mechanism embodying the present invention;

FIG. 3 is a side view similar to FIG. 1 of the printing device but with some parts of the device omitted and other parts of the device in different positions.

Figure 2:
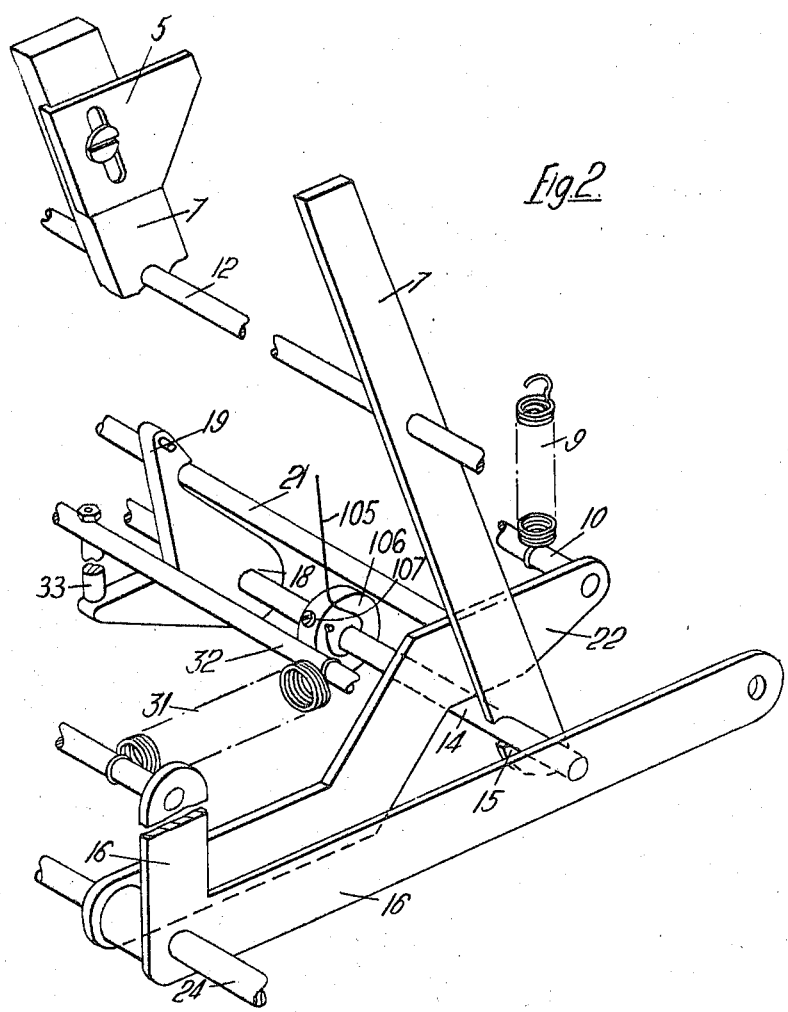
FIG. 2 shows a perspective view of parts of the printing device of FIG. 1 on a larger scale.

The printing device illustrated has a manually operable actuating lever 1 which for convenience is shown partly broken away. The actuating lever 1 is pivotally mounted on a spindle 2 and has an end 4 disposed below the cam surface of a cam 5, which is adjustably secured by means of a screw 6 to a further lever 7. A tension spring 9 is anchored at one end to the end 4 of the actuating lever 1 and at its other end to a spindle 10.

The further lever 7 is pivotable about a spindle 12 and has a notched portion 15 for engaging and retaining a shaft 14. The shaft 14 is mounted in and between a pair of double-armed levers 16, of which one is illustrated in FIG. 1 and the other in FG. 2 and carries a tripping member 18 (see also FIG. 2) having a notched portion 19 engaging a spindle 21 which, like the spindle 10, is carried between a pair of lever arms 22, of which only one is shown in the drawing. The levers 16 and 22 are each pivotally mounted at one end on a spindle 24. A spindle 25 is carried by the free ends of the levers 16 and engages in a notched portion 26 of a printing wheel support 29, which is pivotable about a spindle 30.

A second tension spring 31, which is weaker than the spring 9 is secured between a spindle 28, carried by the free ends of the double-armed levers 16, and a fixed spindle 32. A fixed abutment pin 33 is provided on the spindle 32 for co-operation with the tripping member 18.

The operation of the mechanism described above is as follows:

When the manually operable actuating lever 1 is rotated in a clockwise direction as viewed in FIG. 1, about the spindle 2, the end 4 of this lever tensions the spring 9 and strikes the cam 5 to pivot the lever 2 in an anti-clockwise direction, as viewed in FIG. 1, about the spindle 12. The notched portion 15 is thus disengaged from the spindle 14, whereupon the levers 16 and the levers 22, which are locked relative to the levers 16 by the tripping member 18, pivot together about the spindle 24 under the action of the spring 9, which is stronger than the spring 31. During this pivotation, the printing wheel support 29 is caused by the spindle 25 to pivot in a clockwise direction, as viewed in FIG. 1, about the spindle 30. In addition, the tripping member 18 is moved into abutment against the fixed pin 33, which causes the tripping member 18 to pivot about the spindle 14 and out of engagement with the spindle 21. This releases the levers 16 from the levers 22, and while the levers 22 continue to pivot under the action of the spring 9, the levers 16 continue to pivot in the same direction against the action of the spring 31 under the momentum of the printing wheel support 29, until printing wheels 34 mounted thereon strike against a counter-surface i.e. a platen (not shown), or a sheet of paper on such surface, whereupon the levers 16 reverse their direction of rotation under the action of the spring 31.

When after the print has been effected, the actuating lever 1 is returned to its initial position shown in FIG. 1. The turns of the coil spring 9 close so that this spring acts almost as a rigid member and lowers the levers 22, so that the above-described parts are returned to their initial positions shown in FIG. 1.

For indexing purposes, the printing wheel 34 is provided with an indexing mechanism having a toothed drive transmitting member 37 rotatably mounted on the spindle 2. As can be seen from FIG. 1, the driving member 37 is formed over a portion of its periphery with gear teeth 38, which are shaped for engagement with corresponding teeth 39 of the printing wheel 34. Over a different portion of its periphery, the toothed driving member 37 is formed with a plurality of projecting portions 40, the number of these portions 40 being equal to the number of teeth 39 on the printing wheel 34, which in the present embodiment is ten.

A pawl 41 mounted on the printing wheel support 29 by a pivot pin 42 (see also FIGS. 3 and 4) is urged against the printing wheel 34 by a spring 43 and is shaped to fit between adjacent teeth 39 of the printing wheel 34 for holding the latter in position relative to the printing wheel support 29.

The spring 43 acts on a projecting portion 44 of the pawl 41, and urges the projecting portion 44 against a pawl actuator 45, which is at one end pivotally mounted on a spindle 47 and has a portion in the form of a detent 48 shaped to engage in the tooth spaces between the teeth 38 of the toothed member 37.

A level 50 is pivotally secured at one end to the actuating lever 1 and at its other end to a lever 51, which is in turn pivotable about a spindle 52 and carries a cam member 53.

The projecting portions 40 of the toothed member 37 may be formed with, for example, numerals corresponding to type face numerals formed on the crowns of the teeth 39 of the printing wheel 34, and the toothed member 37 may be rotatable, for example, by a lever (not shown) secured thereto or any other convenient means, to bring a desired one of projecting portions 40 into a position, for example, opposite an aperture in a plate or housing (not shown) in order to position a corresponding tooth 39 ready for printing.

Figure 4:
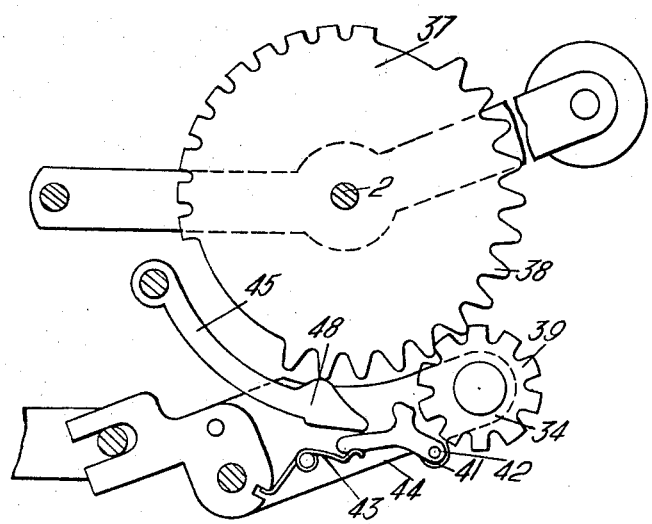
FIG. 4 is a side view similiar to FIG. 1 of the printing device but with some parts of the device omitted, and shows the position of the pawl during rotation of a toothed wheel.

When the printing wheel 34 is rotated by the toothed member 37, actuating motion is imparted to the pawl actuator 45 by a camming action between the toothing of the toothed member 37 and the detent portion 48 of the pawl actuator 45, which is rocked about the spindle 47 against the action of the spring 43, as shown in FIG. 4. The pawl 41 is accordingly rocked about the pivot pin 42, so as to move the pawl 41 out of contact with the printing wheel 34 during the passage of the crown of each tooth 39 past the pawl 41. In this way, the pawl 41 is prevented from rubbing against, and wearing, the type on the crowns of the teeth 39.

When the actuating lever 1 is pivoted about the spindle 2 in a clockwise direction as described above, the lever 51 is also pivoted in a clockwise direction, as viewed in FIG. 1, about the spindle 52 by the lever 50. The cam member 53 is shaped so that, upon such pivoting it contacts the pawl actuator 45 and locks it against the toothed member 37. Thus, during pivoting of the printing wheel support 29 as shown in FIG. 3, which brings the printing wheel 34 out of meshing engagement with the toothed member 37, the latter is prevented by the pawl actuator member 45 from rotating, while the printing wheel 34 is held relative to the printing wheel support 29 by the pawl 41.

When the printing has been completed and the actuating lever 1 is released, it is returned to its initial position shown in FIG. 1 by a return spring 101 which is held by a fixedly mounted screw 102. The lever 7 is returned by a spring 103 carried on the shaft 12 and bearing at opposite ends against the spindle 32 and the lever 7. The tripping member is formed with a pin 104 and returned by a spring 105 bearing at one end against the pin 104 and anchored at its opposite end in a bushing 106, which is adjustably secured on the shaft 14 by a screw 107 to allow adjustment of the force exerted by the spring on the tripping member 18.

The printing wheel 34 may be one of a plurality of printing wheels mounted on a corresponding number of printing wheel supports pivotable about the spindle 30 by the spindle 25, the printing wheels being associated with a corresponding number of toothed drive transmitting members, pawls and pawl actuators such as those described above.

It should be clearly understood that the specific embodiment hereinbefore described and illustrated in the attached drawings is given by way of example. Modifications, ommissions and additions are possible without departing from the spirit of this invention.

I claim:

1. A pawl mechanism comprising a turnable support, a first toothed wheel rotatably mounted on said support, a first pawl mounted on said support and engageable with said first toothed wheel for preventing accidental rotation thereof, a second toothed wheel rotatably mounted independently of said support and arranged to be in mesh with said first toothed wheel when said support is in a predetermined position in which said first toothed wheel is rotatable in dependence on rotation of said second toothed wheel, a second pawl mounted independently of said support and engageable with said second toothed wheel for preventing accidental rotation thereof, said second pawl being arranged to bear against said first pawl when said support is in said predetermined position, said second pawl being arranged for completely disengaging said first pawl from said first toothed wheel when, on rotation of said second toothed wheel, said second pawl ratchets over said second toothed wheel, a lever arrangement for turning said support out of said predetermined position, said first and second toothed wheels being out of mesh with each other when said support has been turned out of said predetermined position, said first and second pawls respectively engaging said first and second toothed wheels to prevent accidental rotation of said toothed wheels while they are out of mesh with each other, a cam arranged to hold said second pawl in engagement with said second toothed wheel when said cam is in its operative position and to release said second pawl when said cam is in its inoperative position, and an arm operatively linked to said lever arrangement and to said cam for moving said cam into its operative position when said support is turned out of said predetermined position and for returning said cam into its inoperative position when said support is in its predetermined position.

2. A pawl mechanism as defined in claim 1, and further comprising a spring arranged to act directly on said first pawl to urge said first pawl into engagement with said first toothed wheel, said spring acting indirectly through said first pawl on said second pawl to urge said second pawl into engagement with said toothed wheel when said second pawl bears against said first pawl.

3. A pawl mechanism as defined in claim 2 wherein said first pawl includes a portion projecting from said first pawl away from said first toothed wheel, said second pawl bearing against said projecting portion when said support is in said predetermined position, said spring acting on said projecting portion.

4. A pawl mechanism comprising a turnable support, a first toothed wheel rotatably mounted on said support, a first pawl mounted on said support and engageable with said first toothed wheel for preventing accidental rotation thereof, a second toothed wheel rotatably mounted independently of said support and arranged to be in mesh with said first toothed wheel when said support is in a predetermined position in which said first toothed wheel is rotatable in dependence on rotation of said second toothed wheel, a second paw mounted independently of said support and engageable with said second toothed wheel for preventing accidental rotation thereof, said second pawl being arranged to bear against said first pawl when said support is in said predetermined position, said second pawl being arranged for completely disengaging said first pawl from said first toothed wheel when, on rotation of said second toothed wheel, said second pawl ratchets over said second toothed wheel, a lever arrangement for turning said support out of said predetermined position, said first and second toothed wheels being out of mesh with each other when said support has been turned out of said predetermined position, said first and second pawls respectively engaging said first and second toothed wheels to prevent accidental rotation of said toothed wheels while they are out of mesh with each other, first means arranged for holding said second pawl in engagement with said second toothed wheel, when said first means in its operative position and for releasing said second pawl when said first means is in an inoperative position, and second means linked to said lever arrangement and to said first means for moving said first means into its operative position when said support is turned out of said predetermined position and for returning said first means into its operative position when said support is in its predetermined position.

References Cited
UNITED STATES PATENTS

| | | | |
|---|---|---|---|
| 656,380 | 8/1900 | Smith | 74—152 X |
| 907,577 | 12/1908 | Diehl | 101—97 |
| 1,136,891 | 4/1915 | Candee | 74—155 X |
| 1,899,250 | 2/1933 | Wheelbarger et al. | 74—527 |
| 2,435,434 | 2/1948 | Kosmer | 101—95 |
| 2,573,756 | 11/1951 | Anderson | 101—95 |
| 2,623,455 | 12/1952 | Couffignal | 101—96 |
| 2,879,712 | 3/1959 | Mark | 101—95 |

FRED C. MATTERN, Jr., *Primary Examiner.*

C. F. GREEN, *Assistant Examiner.*